(12) United States Patent
Poulin

(10) Patent No.: US 9,745,136 B2
(45) Date of Patent: Aug. 29, 2017

(54) SEGMENTED ARTICULATING CONVEYOR

(71) Applicant: Zoetis Canada Inc., Kirkland (CA)

(72) Inventor: Patrick Poulin, London (CA)

(73) Assignee: ZOETIS CANADA INC., Kirkland, Quebec (CA)

( * ) Notice: Subject to any disclaimer, the term of this patent is extended or adjusted under 35 U.S.C. 154(b) by 0 days.

(21) Appl. No.: 15/049,415

(22) Filed: Feb. 22, 2016

(65) Prior Publication Data

US 2016/0251163 A1 Sep. 1, 2016

Related U.S. Application Data

(60) Provisional application No. 62/121,876, filed on Feb. 27, 2015.

(51) Int. Cl.
*B65G 15/02* (2006.01)
*B65G 21/14* (2006.01)
*B65G 21/10* (2006.01)
*B65G 15/62* (2006.01)
*B65G 21/16* (2006.01)
*B65G 41/00* (2006.01)

(52) U.S. Cl.
CPC ............ *B65G 21/10* (2013.01); *B65G 15/02* (2013.01); *B65G 15/62* (2013.01); *B65G 21/16* (2013.01); *B65G 41/008* (2013.01)

(58) Field of Classification Search
CPC ......... B65G 21/14; B65G 15/02; B65G 21/16
USPC ............................................. 198/831, 861.2
See application file for complete search history.

(56) References Cited

U.S. PATENT DOCUMENTS

| | | | |
|---|---|---|---|
| 3,584,731 A | 6/1971 | Dahlem et al. | |
| 4,476,975 A | 10/1984 | Densmore | |
| 6,155,400 A | * 12/2000 | Daigh | B65G 41/008 198/301 |
| 7,222,731 B2 | 5/2007 | Taylor et al. | |
| 7,438,180 B1 | 10/2008 | Taylor et al. | |
| 2006/0231373 A1 | * 10/2006 | Taylor | B65G 21/10 198/861.2 |

OTHER PUBLICATIONS

PCT International Search Report and Written Opinion, International Filing Date Feb. 24, 2016; International Application No. PCT/US2016/019292.

* cited by examiner

*Primary Examiner* — Leslie A Nicholson, III
*Assistant Examiner* — Lester Rushin
(74) *Attorney, Agent, or Firm* — Scott C. Mayhew

(57) ABSTRACT

A segmented articulating conveyor is provided that is articulable between a straight configuration and an articulated configuration. The segmented articulating conveyor has a plurality of conveyor segments forming a conveyor system. The conveyor segments are pivotally connected to one another to permit manual articulation of the conveyor system between straight and articulated configurations. A belt is operably engaged with the conveyor segments, the belt being configured to accommodate an arc of the conveyor system when in the articulated configuration. A motor is operatively engaged with the belt and configured to move the belt. An associated method is also provided.

5 Claims, 4 Drawing Sheets

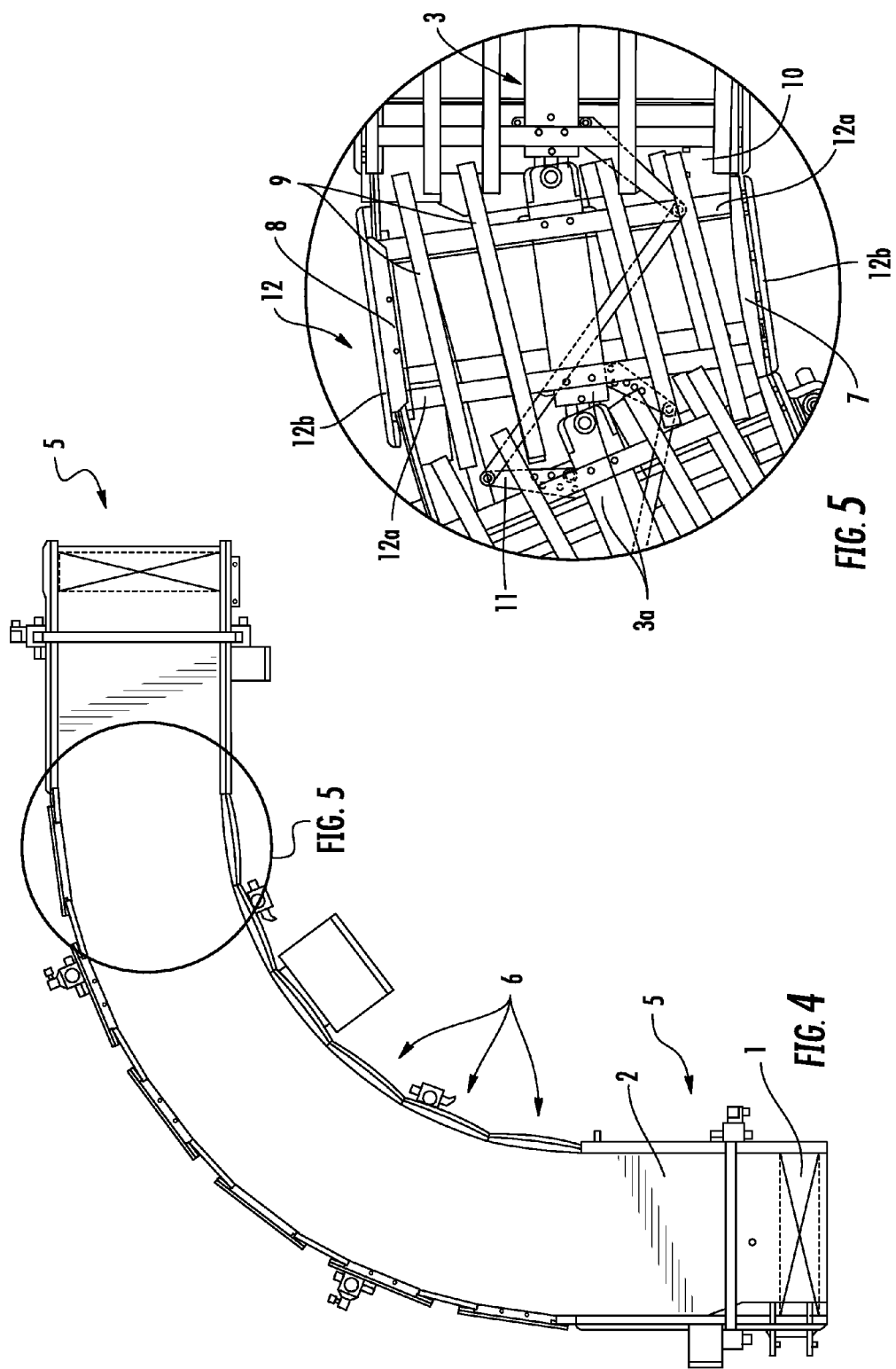

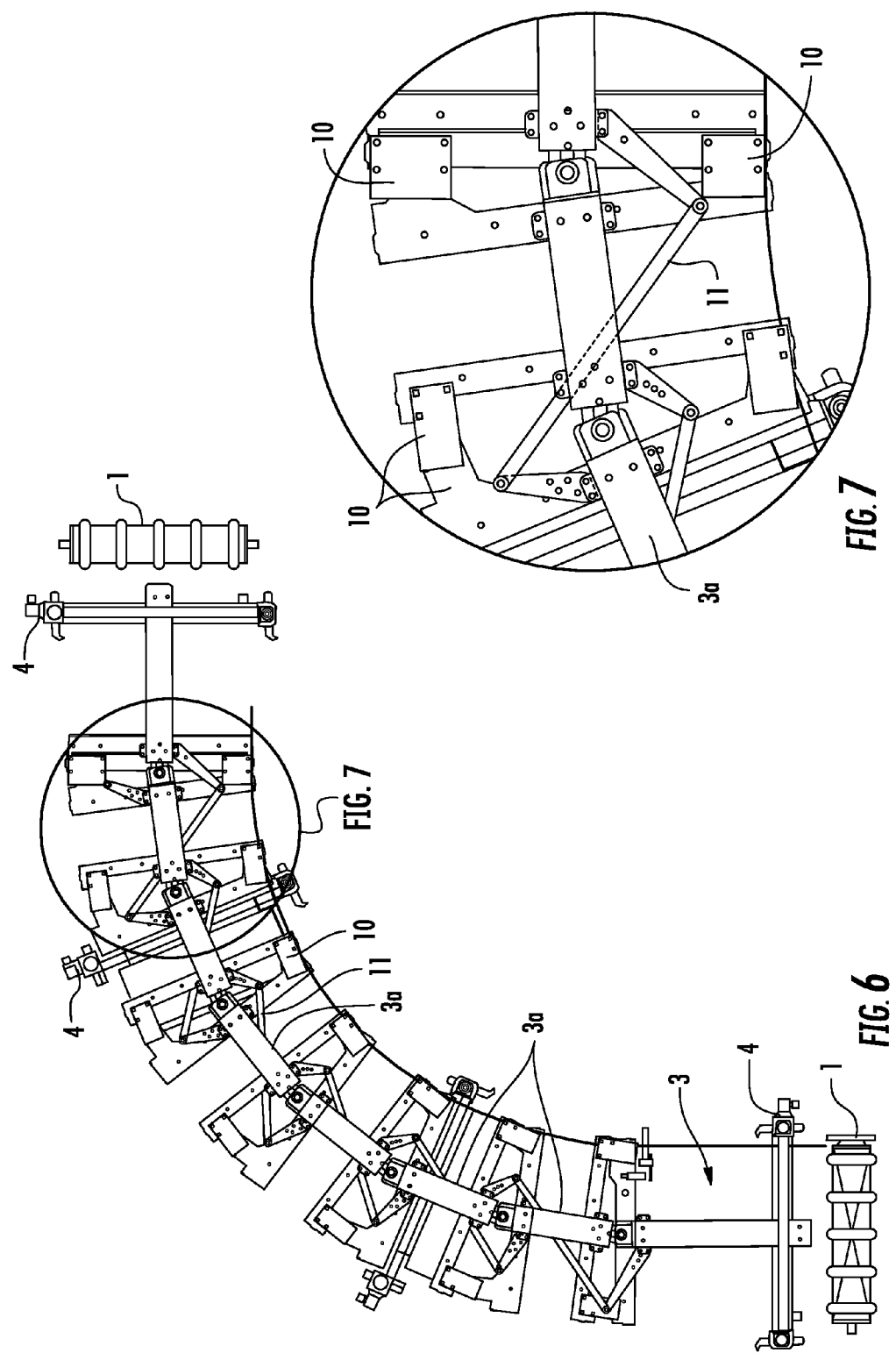

SEGMENTED ARTICULATING CONVEYOR

CROSS REFERENCE TO RELATED APPLICATION

This application claims the benefit of U.S. Provisional Patent Application No. 62/121,876 filed Feb. 27, 2015, which is expressly incorporated herein by reference in its entirety.

TECHNICAL FIELD

The present disclosure relates to conveyors systems for moving items or objects in an automated manner.

BACKGROUND

Existing articulating conveyors are expensive and difficult to manipulate and position. Many operations require only intermittent use of a conveyor, or have space limitations that prevent the permanent installation of a conveyor.

Accordingly, there is a need for an articulating conveyor with a small equipment footprint that is relatively inexpensive, easy to operate and manipulate, and portable.

BRIEF SUMMARY

A segmented articulating conveyor, according to the present disclosure, has one or more motors, a belt, a structural spine, legs, and a plurality of segments. The conveyor has two end segments and a plurality of intermediate segments. Each intermediate segment has a spine segment, an inner lateral guide, an outer lateral guide, one set of belt support guides, stabilizer plates, and a linkage mechanism. One or both end segments additionally include a motor, gearbox, and belt drive, which operates the conveyor. The conveyor is adapted to be articulated and moved into position to accommodate left-handed or right-handed applications.

According to one aspect of the present disclosure, the segmented articulating conveyor has a plurality of conveyor segments forming a conveyor system. The conveyor segments are pivotally connected to one another to permit manual articulation of the conveyor system between straight and articulated configurations. A belt is operably engaged with the conveyor segments, the belt being configured to accommodate an arc of the conveyor system when in the articulated configuration. A motor is operatively engaged with the belt and configured to move the belt.

BRIEF DESCRIPTION OF THE DRAWINGS

In order that the present disclosure may be more clearly understood, a preferred embodiment thereof will now be described in detail by way of example, with reference to the accompanying drawings, in which:

FIG. 4 is a top view of the conveyor, shown in the articulated configuration.

FIG. 5 is an expanded view of the circled section of the conveyor in FIG. 4, shown with the belt removed.

FIG. 6 is a top view of the certain structural elements of the conveyor, shown in an articulated configuration, including the structural spine, linkages, legs, and stabilizer plates.

FIG. 7 is an expanded view of the circled section of the structural elements of the conveyor in FIG. 6.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

The segmented articulating conveyor, according to the present disclosure, provides a conveyor that is articulable between a straight configuration and an articulated configuration, with the conveyor curved, for example, at 90°. The conveyor is made up of a plurality of generally rectangular conveyor segments that are pivotally connected to one another to permit manual articulation of the conveyor between the straight and articulated configurations.

Figure 1:
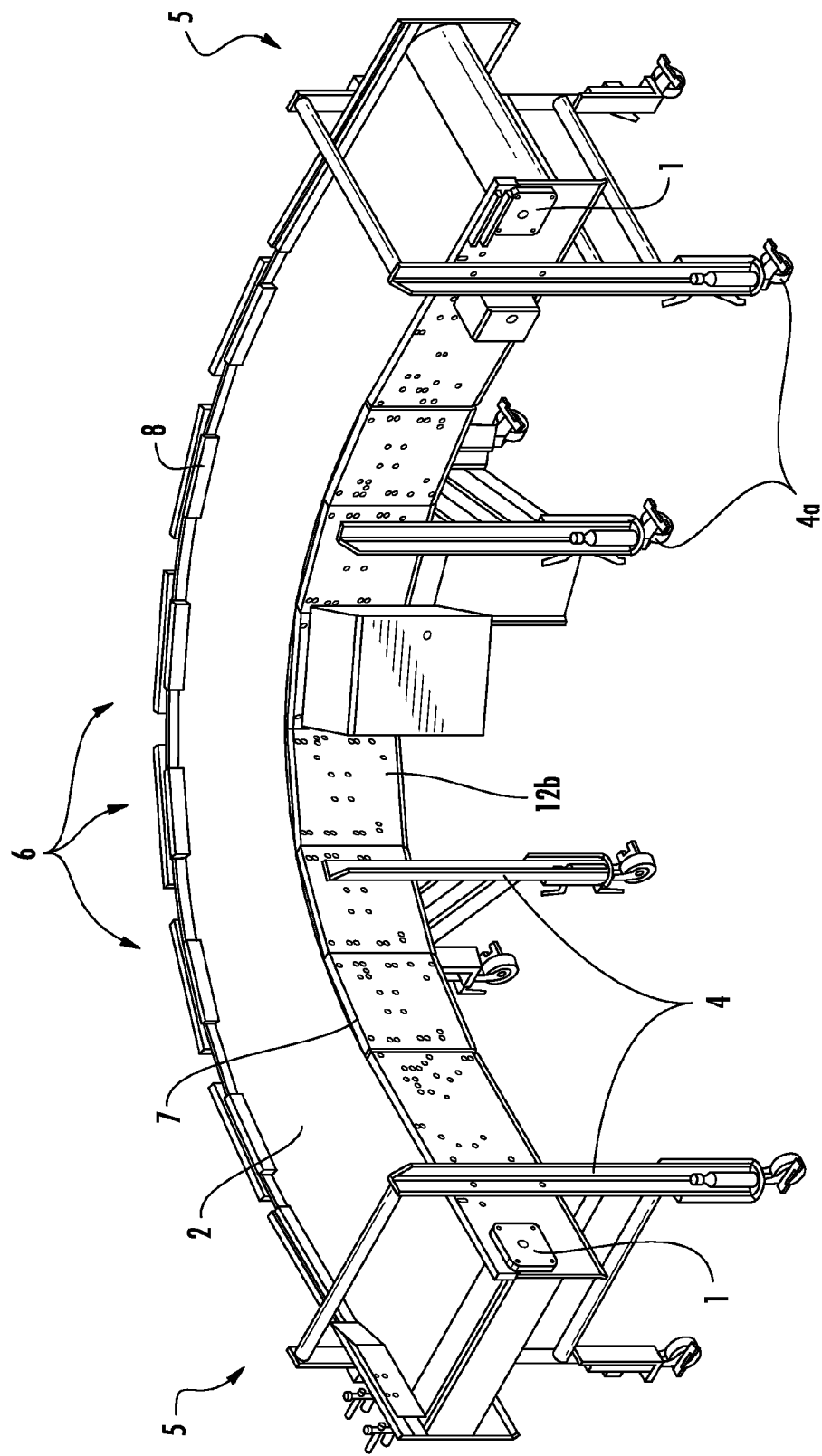
FIG. 1 is a perspective view of the segmented articulating conveyor, according to the present invention, with the conveyor shown in the articulated configuration.
Figure 2:
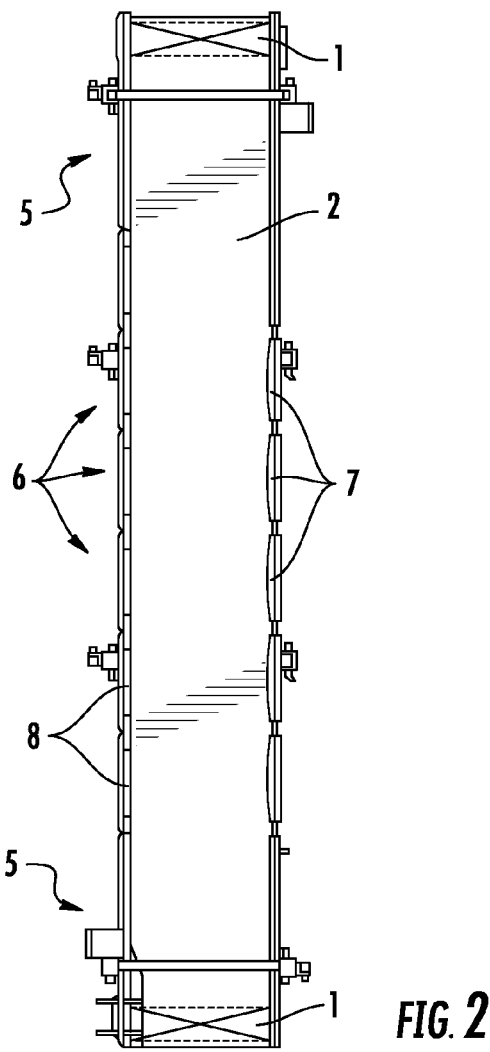
FIG. 2 is a top view of the conveyor, shown in the straight configuration.
Figure 3:
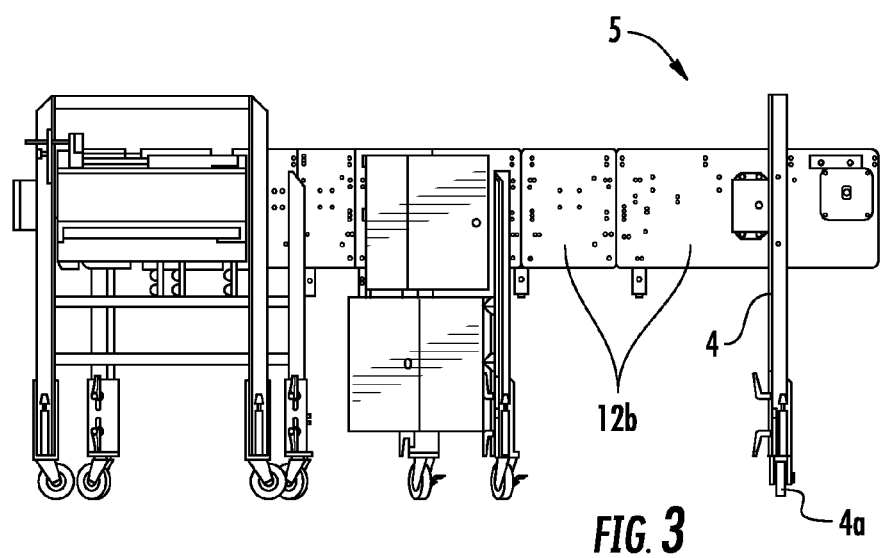
FIG. 3 is a side view of the conveyor, shown in the articulated configuration.

As shown in FIG. 1, the segmented articulating conveyor has one or more motors 1 at either end, a belt 2, a structural spine 3, legs 4, two end segments 5, and a plurality of intermediate segments 6. The motors 1 are preferably integrated in-shaft drive motor gearboxes, which include a motor, gearbox, and belt drive. The belt 2 is preferably a mesh-style belt, but other belt types may be selected based on the desired application so long as the belt is able to accommodate the arc of the conveyor. A pair of legs 4 is attached, on opposing sides of the conveyor, to each end segment 5 and one or more intermediate segments 6. The legs 4 are preferably height adjustable to permit the conveyor to be used on an uneven surface and have wheels or casters 4a to permit the conveyor to be repositioned as required. Preferably, each pair of legs 4 is connected, or braced, as shown in FIGS. 1 and 3, to provide structural support to the legs 4.

Each end segment 5 and intermediate segment 6 has an interconnecting spine segment 3a, an inner lateral guide 7, an outer lateral guide 8, a set of belt support guides 9, stabilizer plates 10, an interconnecting linkage 11, and a frame 12. The individual end segments 5 and intermediate segments 6 have a generally rectangular and rigid structure and are not, themselves, curved. The conveyor is able to articulate between a straight configuration and an articulated configuration because the conveyor segments are interconnected and pivotally attached to adjacent conveyor segments, as shown in FIGS. 1, 2, and 5-7.

One or both end segments 5 have a motor 1 operatively engaged with the belt 2. Preferably, both end segments 5 have a motor 1, thereby permitting the operation attic conveyor in both directions. Alternatively, one of the intermediate segments 6 may be provided with a motor 1, rather than one of both end segments 5 and a belt tensioning system (not shown) may be provided.

The structural spine 3 of the conveyor consists of as plurality of interconnected pivotally attached spine segments 3a. Each spine segment 3a is attached to and extends beyond the frame 12 of one conveyor segment and is pivotally attached to the spine segments 3a of the adjacent conveyor segments. As shown in FIG. 5, the frame 12 of each conveyor segment has two cross-members 12a and two side plates 12b. The crossmembers 12a extend between the opposing side plates 12b of the frame 12. Preferably, the spine segments 3a attach to the cross-members 12a of the frame 12 midway between the side plates 12b, as shown in FIG. 5. As shown in FIGS. 3, 5, and 7, the frame 12 also provides attachment points for the legs 4, inner lateral guides 7, outer lateral guides 8, belt support guides 9, stabilizer plates 10, and linkages 11.

As shown in FIG. 5, the inner lateral guides 7 (with reference to the radius of curvature of the articulated conveyor) are attached to the belt-facing side of the side plates 12b. The inner lateral guides 7 have the same curved or convex shape as the radius of curvature of the articulated conveyor. The inner lateral guides 7 have a channel (not shown), within which the belt 2 travels. The inner lateral guides 7 are also sized so that the edges of the inner lateral guides 7 on each adjacent conveyor segment abut one another when the conveyor is in the articulated configuration and are spaced apart when the conveyor is in the straight configuration.

The outer lateral guides 8, with reference to the radius of curvature of the articulated conveyor, are attached to the belt-facing side of the side plates 12b. The outer lateral guides 8 may be straight and are sized so that the edges of the outer lateral guides 8 abut one another when the conveyor is in the straight configuration and are spaced apart when the conveyor is in the articulated configuration. The outer lateral guides 8 may have a channel (not shown), within which the belt 2 travels.

As shown in FIG. 5, a set of belt support guides 9 is attached to the crossmembers 12a on each conveyor segment to support the underside of the belt 2. Preferably, four belt support guides 9 are spaced apart between the side plates 12b and are arranged, or offset from one another, to nest with the belt support guides 9 of the adjacent conveyor segment and not interfere therewith when the conveyor is articulated.

As shown in FIGS. 6 and 7, stabilizer plates 10 are attached to the underside of each conveyor segment. The stabilizer plates 10 extend beyond the end of the conveyor segment to engage with the stabilizer plates 10 of the adjacent conveyor segment and prevent sagging or tilting of one conveyor segment relative to the others, which could cause the belt 2 to snag as it travels between adjacent conveyor segments. The stabilizer plates 10 and the structural spine 3 both provide stability to maintain the conveyor segments in the same horizontal plane, particularly between intermediate segments 6 that are not provided with a pair of legs 4. As shown in FIGS. 6 and 7, the stabilizer plates 10 on one conveyor segment slidingly engage with the stabilizer plates 10 on the adjacent conveyor segment by way of one stabilizer plate 10 overlying the adjacent stabilizer plate 10 to limit relative vertical motion therebetween, but permit lateral motion therebetween. Preferably, one stabilizer plate 10 at both sides of each conveyor segment slides between two vertically spaced apart stabilizer plates 10 at both sides of the adjacent conveyor segment, as shown in FIG. 7.

As shown in FIGS. 5-7, a linkage 11 attaches at one end to the spine segment 3a of one conveyor segment and at the other end to the spine segment 3a of conveyor segment next to the adjacent conveyor segment. The linkages 11 maintain a constant arc to the conveyor by ensuring that all conveyor segments are positioned at the same angle relative to their adjacent conveyor segments. This prevents the conveyor from adopting a snake-like, or S-shaped, configuration. As the conveyor is moved between the straight and articulated configuration the angle changes simultaneously between each adjacent conveyor segment, thereby maintaining a single constant curvature to the arc of the conveyor. Preferably, the conveyor has a 90° arc when in the articulated configuration, but may be designed for any desired angle.

The segmented articulating conveyor, according to the present disclosure, provides portability, since it may be transported around a facility on the casters while in the straight configuration, for example, permitting it to be transported down narrow hallways. The conveyor is also height adjustable, permitting it to operate on uneven surfaces. The conveyor is simple to manipulate, permitting manual articulation between the straight and articulated configurations and manual repositioning on the casters. The conveyor also has a small equipment footprint and may be straightened and repositioned for storage, for example, against a wall.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A segmented articulating conveyor, comprising:
   a plurality of conveyor segments forming a conveyor system, the conveyor segments being pivotally connected to one another to permit manual articulation of the conveyor system between straight and articulated configurations, the plurality of conveyor segments comprising two end segments and a plurality of intermediate segments;
   a structural spine operably engaged with the conveyor segments, the structural spine having a plurality of interconnected pivotally attached spine segments, wherein each conveyor segment has an interconnecting linkage attached at one end to the spine segment of one conveyor segment and at the other end to the spine segment of the conveyor segment next to the adjacent conveyor segment;
   a belt operably engaged with the conveyor segments, the belt being configured to accommodate an arc of the conveyor system when in the articulated configuration; and
   a motor operatively engaged with the belt and configured to move the belt.

2. A segmented articulating conveyor according to claim 1, wherein each conveyor segment includes a frame, and wherein each spine segment is attached to and extends beyond the frame of one conveyor segment and is pivotally attached to the spine segments of the adjacent conveyor segments.

3. A segmented articulating conveyor according to claim 1, wherein each end segment and intermediate segment has an inner lateral guide sized so that edges of the inner lateral guides on each adjacent conveyor segment abut one another when the conveyor system is in the articulated configuration and are spaced apart when the conveyor is in the straight configuration.

4. A segmented articulating conveyor according to claim 3, wherein each end segment and intermediate segment has an outer lateral guide sized so that edges of the outer lateral guides on each adjacent conveyor segment abut one another when the conveyor system is in the straight configuration and are spaced apart when the conveyor is in the articulated configuration.

5. A segmented articulating conveyor according to claim 1, wherein each conveyor segment has a stabilizer plate attached to an underside thereof, the stabilizer plates extending beyond an end of the conveyor segment to engage with the stabilizer plates of the adjacent conveyor segment.

* * * * *